United States Patent
Shin et al.

(10) Patent No.: US 12,441,173 B2
(45) Date of Patent: Oct. 14, 2025

(54) BATTERY ASSEMBLY MOUNTING STRUCTURE FOR A VEHICLE

(71) Applicants: HYUNDAI MOTOR COMPANY, Seoul (KR); KIA CORPORATION, Seoul (KR)

(72) Inventors: Gyung Hoon Shin, Seoul (KR); Jong Wook Lee, Cheonan-si (KR); Gun Woo Ko, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 524 days.

(21) Appl. No.: 18/076,145

(22) Filed: Dec. 6, 2022

(65) Prior Publication Data
US 2024/0059134 A1 Feb. 22, 2024

(30) Foreign Application Priority Data
Aug. 17, 2022 (KR) .......................... 10-2022-0102852

(51) Int. Cl.
*B60K 1/04* (2019.01)
*B60L 50/64* (2019.01)

(52) U.S. Cl.
CPC ................ *B60K 1/04* (2013.01); *B60L 50/64* (2019.02)

(58) Field of Classification Search
CPC ................................... B60K 1/04; B60L 50/64
See application file for complete search history.

(56) References Cited

U.S. PATENT DOCUMENTS

| | | | |
|---|---|---|---|
| 11,400,986 B2* | 8/2022 | Jeong ................. | B62D 25/2018 |
| 11,661,020 B2* | 5/2023 | Ki ........................... | B60L 50/64 |
| | | | 180/68.5 |
| 11,919,403 B2* | 3/2024 | Wang .................. | H01M 50/298 |
| 12,202,325 B2* | 1/2025 | Jeong ................. | B62D 25/2018 |
| 2021/0050570 A1* | 2/2021 | Dunlap ............... | H01M 50/249 |
| 2023/0238634 A1* | 7/2023 | Shin ......................... | B60K 1/04 |
| | | | 429/100 |
| 2023/0253660 A1* | 8/2023 | Jeong ...................... | B60K 1/04 |
| | | | 429/122 |

FOREIGN PATENT DOCUMENTS

KR 20210001334 A 1/2021

* cited by examiner

*Primary Examiner* — Bryan A Evans
(74) *Attorney, Agent, or Firm* — Lempia Summerfield Katz LLC

(57) ABSTRACT

A battery assembly mounting structure for a vehicle includes: a through pipe provided in a battery assembly such that a space vertically passing through the battery assembly is formed in an inner portion of the battery assembly, a swappable assembly coupled to an inner portion of the through pipe by an elastic force, and a fastening bolt which passes through an inner portion of the swappable assembly and is coupled to a vehicle body positioned at an upper side of the fastening bolt such that a fastening pressure is applied to a lower end of the through pipe.

16 Claims, 7 Drawing Sheets

BATTERY ASSEMBLY MOUNTING STRUCTURE FOR A VEHICLE

CROSS REFERENCE TO RELATED APPLICATION

The present application claims priority to Korean Patent Application No. 10-2022-0102852, filed on Aug. 17, 2022, the entire contents of which are incorporated herein for all purposes by reference.

BACKGROUND

Field

The present disclosure relates to a technology about a structure for mounting a battery assembly in a vehicle.

DESCRIPTION OF THE RELATED ART

A high voltage battery (hereinafter, referred to as "a battery assembly") is mounted in an electric vehicle, a hybrid vehicle, and the like. Such a battery assembly may be mounted on a lower side of the vehicle.

Particularly, since there is a disadvantage that an electric vehicle has a relatively long charging time compared to a fueling time of a general internal combustion engine vehicle, a method of replacing a battery assembly by detaching the battery assembly in a vehicle has been studied in order to solve the disadvantage.

The foregoing statement is provided to enhance the understanding of the background of the present disclosure. Thus, the information in this Background section is not intended to mean that the information falls within the purview of the related art that is already known to those having ordinary skill in the art.

SUMMARY

The present disclosure provides a battery assembly mounting structure for a vehicle, in which a fastening bolt for mounting a battery assembly on a lower side of a vehicle body maintains a state in which the fastening bolt is assembled together with the battery assembly even when the fastening bolt separates the battery assembly from the vehicle body. Thus, the fastening bolt does not have to be handled separately from the battery assembly and the fastening bolt is capable of being reused when the battery assembly is repeatedly detached from the vehicle.

In addition, another objective of the present disclosure is to provide a battery assembly mounting structure for a vehicle, which is capable of easily solving assembling tolerance when a battery assembly is mounted in a vehicle body. In addition, the battery assembly mounting structure is capable of appropriately guiding a fastening angle of a fastening bolt so as to prevent misassembly so that assembling and disassembling workability is excellently secured. The battery assembly mounting structure provides ease of replacing the fastening bolt when the fastening bolt is damaged.

In addition, still another objective of the present disclosure is to provide a battery assembly mounting structure for a vehicle, which is capable of securing ease of replacing a battery assembly even when the battery assembly is mounted in a vehicle body while the battery assembly mounting structure is damaged or deformed and the battery assembly mounting structure is desired to be replaced.

In order to achieve the above objectives, according to one aspect of the present disclosure, there is provided a battery assembly mounting structure for a vehicle. In particular, the battery assembly mounting structure includes: a through pipe provided in a battery assembly such that a space vertically passing through the battery assembly is formed in an inner portion of the battery assembly; a swappable assembly coupled to an inner portion of the through pipe by an elastic force; and a fastening bolt which passes through an inner portion of the swappable assembly and is coupled to a vehicle body positioned at an upper side of the fastening bolt such that a fastening pressure is applied to a lower end of the through pipe.

In one embodiment, a fixing groove for fixing the swappable assembly may be provided in the inner portion of the through pipe, and a fixing protrusion protruding outward and elastically coupled to the fixing groove may be provided on the swappable assembly.

In one embodiment, the fixing groove may be formed in an inner circumferential surface of the through pipe such that the swappable assembly is capable of being fixed to a center portion in a vertical direction of the battery assembly. In addition, a catching step portion may protrude on a center portion in an entire length of the fastening bolt such that the catching step portion is elastically supported on the swappable assembly.

The through pipe may be provided with a limiting portion which protrudes inward on an upper side of the fixing groove and which limits a movement of the swappable assembly, and a lower side of the fixing groove of the through pipe may have a constant opening cross-section.

An upper end of the through pipe may be in contact with an upper casing of the battery assembly, the lower end of the through pipe may be connected to a lower casing of the battery assembly through a mounting cup, and a bolt head of the fastening bolt may be fastened such that the fastening pressure is applied to the lower end of the through pipe through the mounting cup.

The upper end of the through pipe may be fixed to the upper casing by a hollow bolt that is fastened by passing through the upper casing, a thread portion of the fastening bolt may be fastened to a fixing nut that is provided at the vehicle body positioned at an upper side of the battery assembly, and the fixing nut may have an upper side and a lower side fixed to a vehicle body member that is provided at an upper side of a floor panel.

The swappable assembly may include: a first fixing guide provided with the fixing protrusion and elastically fixed to the fixing groove of the through pipe; a sleeve surrounding an outer circumferential surface of the fastening bolt within the first fixing guide; a second fixing guide mounted between the first fixing guide and the sleeve; and a guide spring elastically supporting the sleeve with respect to the second fixing guide.

The sleeve may include: a cylindrical portion surrounding the outer circumferential surface of the fastening bolt; an elastic supporting portion that protrudes downwardly from the cylindrical portion; and a plurality of holding protrusions which protrudes to an inner side of the cylindrical portion from the elastic supporting portion and which is configured to press the outer circumferential surface of the fastening bolt.

The plurality of holding protrusions may be famed in a shape that narrows toward the inner side of the cylindrical portion and expands again, from a lower end portion of the elastic supporting portion to an upper side of the elastic supporting portion.

The guide spring may includes a plurality of leaf springs connecting between the second fixing guide and the sleeve, and surfaces of the plurality of leaf springs may be disposed parallel to a longitudinal direction of the sleeve.

The plurality of leaf springs disposed between the second fixing guide and the sleeve such is configured to form a spiral shape centered on the sleeve.

The second fixing guide may be provided with a tool catching ring which extends long downwardly and which is positioned at a lower inner portion of the through pipe.

In addition, in order to achieve the above objectives, according to another aspect of the present disclosure, there is provided a battery assembly mounting structure for a vehicle. The battery assembly mounting structure includes: a through pipe mounted such that the through pipe passes through between a lower casing and an upper casing of a battery assembly; a swappable assembly fixed to an inner portion of the through pipe; and a fastening bolt which passes through the swappable assembly from a lower side of the swappable assembly to an upper side of the swappable assembly, thereby fixing the battery assembly to a vehicle body positioned at an upper side of the battery assembly, wherein the swappable assembly may be configured such that a state in which a center portion of the fastening bolt is supported by an elastic force from a center portion between the lower casing and the upper casing of the battery assembly is formed.

The center portion of the fastening bolt may be integrally provided with a catching step portion that protrudes outward, and the swappable assembly may include: a sleeve integrally provided with an elastic supporting portion that elastically supports the catching step portion of the fastening bolt; a first fixing guide provided with a fixing protrusion that fix the swappable assembly to the through pipe; and a second fixing guide which is fixed to an inner portion of the first fixing guide and which elastically supports the sleeve by a plurality of guide springs.

A fixing groove into which the fixing protrusion of the swappable assembly is elastically inserted may be formed in an inner circumferential surface of the through pipe, a limiting portion limiting an upward movement of the swappable assembly may be provided at an upper side of the fixing groove, and a lower side of the fixing groove may have a constant opening cross-section so that the swappable assembly is capable of being linearly slid in a vertical direction.

An upper end of the through pipe may be fixed to the upper casing by a hollow bolt while being in a state in which the upper end of the through pipe is in contact with the upper casing of the battery assembly, a lower end of the through pipe may be connected to the lower casing of the battery assembly through a mounting cup, and a bolt head of the fastening bolt may be configured such that a fastening pressure is applied to the lower end of the through pipe through the mounting cup when a thread portion of the fastening bolt is fastened to a fixing nut that is provided at the vehicle body.

In the present disclosure, the fastening bolt for mounting the battery assembly on the lower side of the vehicle body maintains the state in which the fastening bolt is assembled together with the battery assembly even when the fastening bolt separates the battery assembly from the vehicle body, so that the fastening bolt does not have to be handled separately from the battery assembly and the fastening bolt is capable of being reused when the battery assembly is repeatedly detached from the vehicle.

In addition, in the present disclosure, assembling tolerance is easily solved when the battery assembly is mounted in the vehicle body, the fastening angle of the fastening bolt is appropriately guided so as to prevent misassembly so that assembling and disassembling workability is excellently secured, and ease of replacing the fastening bolt when the fastening bolt is damaged is capable of being provided.

In addition, in the present disclosure, when the battery assembly mounting structure is damaged or deformed and the battery assembly mounting structure is desired to be replaced, a battery assembly can be easily replaced even when the battery assembly is mounted in a vehicle body.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Reference is now made in detail to embodiments of the present disclosure, which are illustrated in the accompanying drawings. Wherever possible, the same reference numbers are used throughout the drawings to refer to the same or like parts.

In the following description, the suffixes "module" and "portion" contained in terms of constituent elements to be described are selected or used together in consideration only of the convenience of writing the following specification, and the suffixes "module" and "portion" do not necessarily have different meanings or roles. When a component, device, element, or the like of the present disclosure is described as having a purpose or performing an operation, function, or the like, the component, device, or element should be considered herein as being "configured to" meet that purpose or to perform that operation or function.

In the present disclosure, detailed description of known technologies have been omitted if it is determined that the detailed description of the known technologies can obscure the embodiments of the present disclosure. In addition, the accompanying drawings are merely intended to easily describe the embodiments of the present disclosure, and the spirit and technical scope of the present disclosure is not limited by the accompanying drawings. It should be understood that the present disclosure is not limited to specific disclosed embodiments, but includes all modifications, equivalents and substitutes included within the spirit and technical scope of the present disclosure.

Terms including ordinals such as "first" or "second" used herein may be used to describe various elements, but the elements are not limited by the terms. The terms are only used for the purpose of distinguishing one element from another element.

When a component is referred to as being "connected" or "contacted" to another component, it should be understood that it may be directly connected or contacted to the other component, but other components may exist therebetween. On the other hand, when a component is referred to as being "directly connected" or "directly contacted" to another component, it should be understood that there is no other component therebetween.

Singular expressions include plural expressions unless the context clearly indicates otherwise.

It should be understood that terms such as "including", "having", etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

In addition, "unit" or "control unit" included in the names of the motor control unit (MCU) and the hybrid control unit (HCU) generally refer to a controller that controls a specific function of the vehicle and do not mean a generic function unit.

Each control unit may include a communication device configured to communicate with another control unit or a sensor in order to control a function assigned thereto, a memory configured to store an operating system, logic commands, and input and output information, and at least one processor configured to perform determination, calculation, and decision desired to control the assigned function.

Referring to FIGS. 1 to 6, a battery assembly mounting structure for a vehicle according to an embodiment of the present disclosure includes: a through pipe 3 provided in a battery assembly 1 such that a space vertically passing through the battery assembly 1 is formed in an inner portion of the battery assembly 1; a swappable assembly 5 coupled to an inner portion of the through pipe 3 by an elastic force; and a fastening bolt 7 which passes through an inner portion of the swappable assembly and is coupled to a vehicle body 9 positioned above the fastening bolt 7 such that a fastening pressure is applied to a lower end of the through pipe 3.

Figure 1:
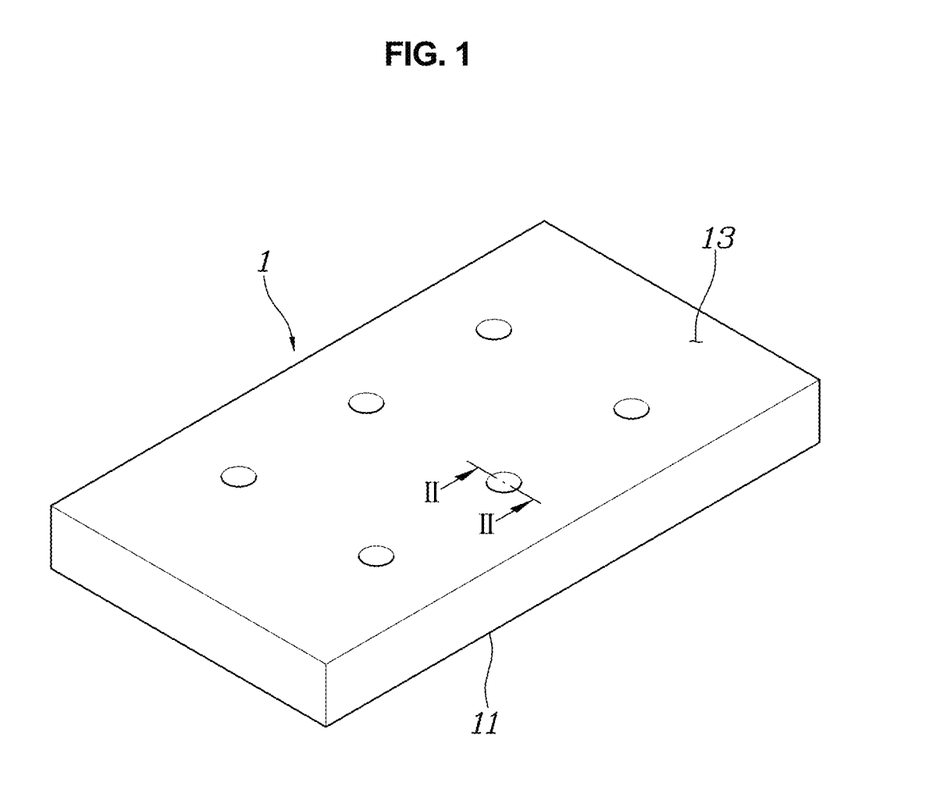
FIG. 1 is a conceptual view illustrating a battery assembly in which a battery assembly mounting structure for a vehicle is applied according to an embodiment of the present disclosure.

When the battery assembly 1 formed as illustrated in FIG. 1 is mounted at a lower side of the vehicle body 9, the swappable assembly 5 is provided at the inner portion of the through pipe 3 that is provided by vertically passing through the battery assembly 1. The fastening bolt 7 is coupled to the vehicle body 9 through the swappable assembly 5, so that the battery assembly 1 is capable of being rigidly fixed to the vehicle body 9.

For reference, the battery assembly 1 as illustrated in FIG. 1 has a configuration in which multiple battery modules are accommodated in the inner portion of the battery assembly 1, a lower casing 11 is provided at a lower side of the battery modules, and an upper casing 13 is coupled to an upper side of the battery modules, so that the battery modules are sealed therein.

A fixing groove 15 for fixing the swappable assembly 5 is provided at the inner portion of the through pipe 3, and a fixing protrusion 17 protruding outward and elastically coupled to the fixing groove 15 is provided at the swappable assembly 5.

Therefore, the swappable assembly 5 is inserted from a lower side of the through pipe 3 into an upper side of the through pipe 3 so that the fixing protrusion 17 is inserted into the fixing groove 15, thereby easily and stably securing a state in which the swappable assembly 5 is fixed to the through pipe 3.

In order to fix the swappable assembly 5 to a center portion in a vertical direction of the battery assembly 1, the fixing groove 15 is formed in an inner circumferential surface of the through pipe 3, and a catching step portion 19 protrudes on a center portion in the entire length of the fastening bolt 7 such that the catching step portion 19 is elastically supported on the swappable assembly 5.

Therefore, the catching step portion 19 of the fastening bolt 7 is elastically supported by the swappable assembly 5 from the center portion in the vertical direction of the battery assembly 1, so that the fastening bolt 7 is not tilted inside the battery assembly 1 and a fastening angle suitable for the fastening bolt 7 to be fastened to the vehicle body 9 is capable of being easily secured.

In other words, when the fastening bolt 7 is fastened to the vehicle body 9 through the battery assembly 1 by using tools such as a nut runner and so on, the swappable assembly 5 serves to maintain and guide an appropriate fastening angle of the fastening bolt 7, thereby realizing smooth and easy fastening work of the fastening bolt 7.

The through pipe 3 is provided with a limiting portion 21 which protrudes inward from an upper side of the fixing groove and which limits a movement of the swappable assembly 5. In particular, the fixing groove 15 is formed such that a lower side of the fixing groove 15 has a constant opening cross-section.

Therefore, when the swappable assembly 5 is coupled to the through pipe 3 and when the swappable assembly 5 is pushed upward through a lower opening portion of the through pipe 3, the swappable assembly 5 is fixed while the fixing protrusion 17 is elastically inserted into the fixing groove 15. At the same time, an upward movement of the swappable assembly 5 is limited by the limiting portion 21, so that misassembly of the swappable assembly is prevented and ease of assemblability is secured.

In addition, when the swappable assembly 5 is assembled by pushing the swappable assembly 5 from the lower side of the through pipe 3 into the upper side of the through pipe 3 or the swappable assembly 5 is removed by pulling the swappable assembly to the lower side of the through pipe 3, there is no catching situation occurs and the swappable assembly 5 is capable of being smoothly assembled and removed since the lower side of the fixing groove 15 of the through pipe 3 has the constant opening cross-section.

An upper end of the through pipe 3 is in contact with the upper casing 13 of the battery assembly 1, a lower end of the through pipe 3 is connected to the lower casing 11 of the battery assembly 1 through a mounting cup 23, and a bolt head 25 of the fastening bolt 7 is fastened such that the bolt head 25 applies the fastening pressure to the lower end of the through pipe 3 through the mounting cup 23.

Figure 2:
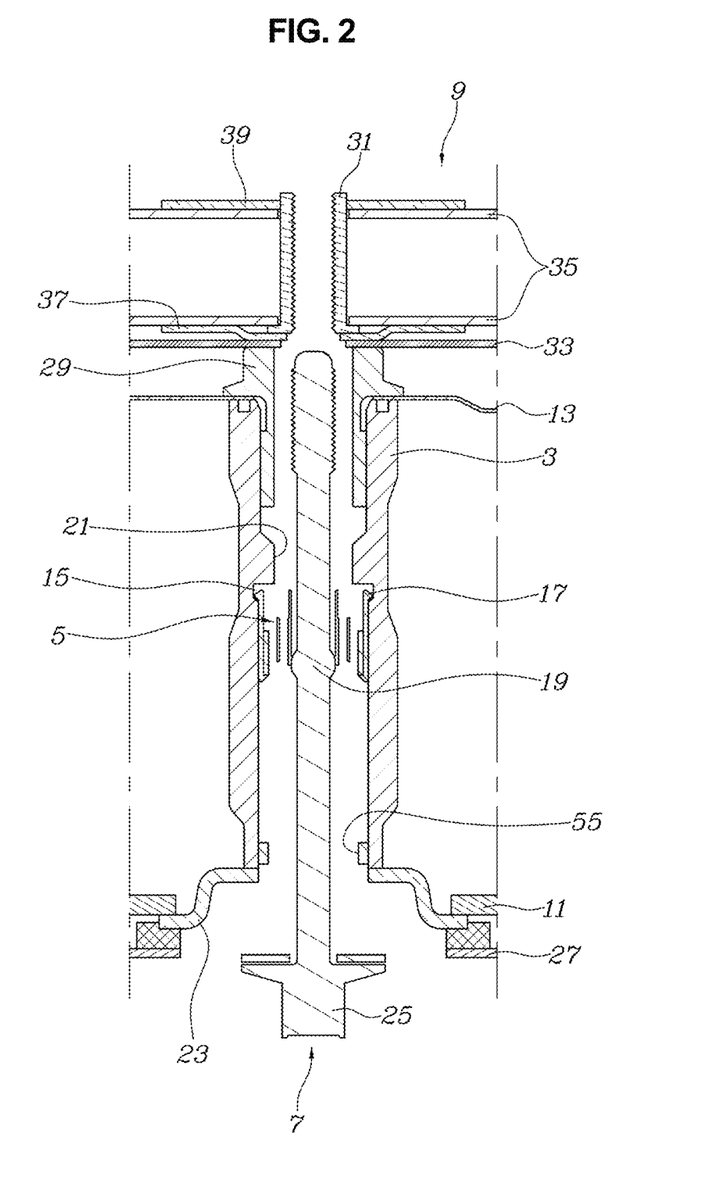
FIG. 2 is a cross-sectional view taken along line II-II in FIG. 1.
Figure 3:
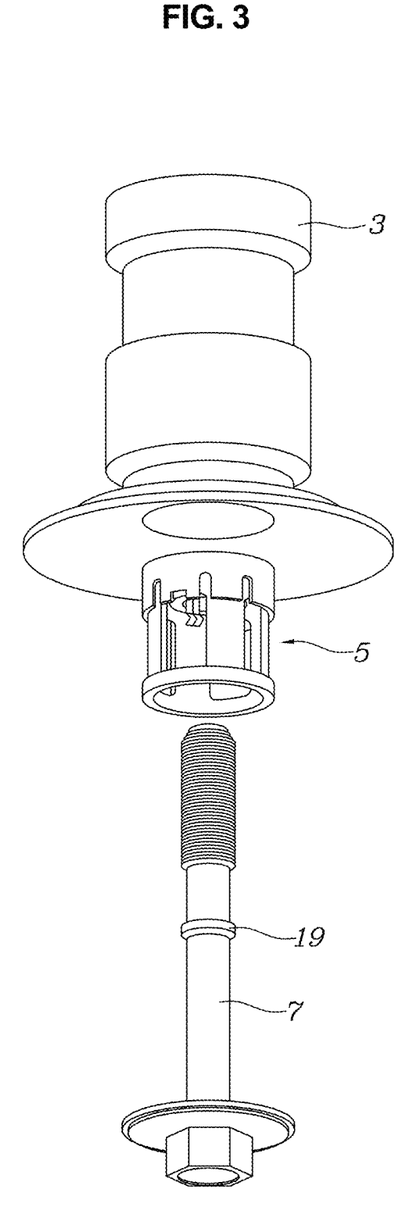
FIG. 3 is an exploded perspective view illustrating main configurations of FIG. 2 in a three-dimensional (3D) manner.
Figure 4:
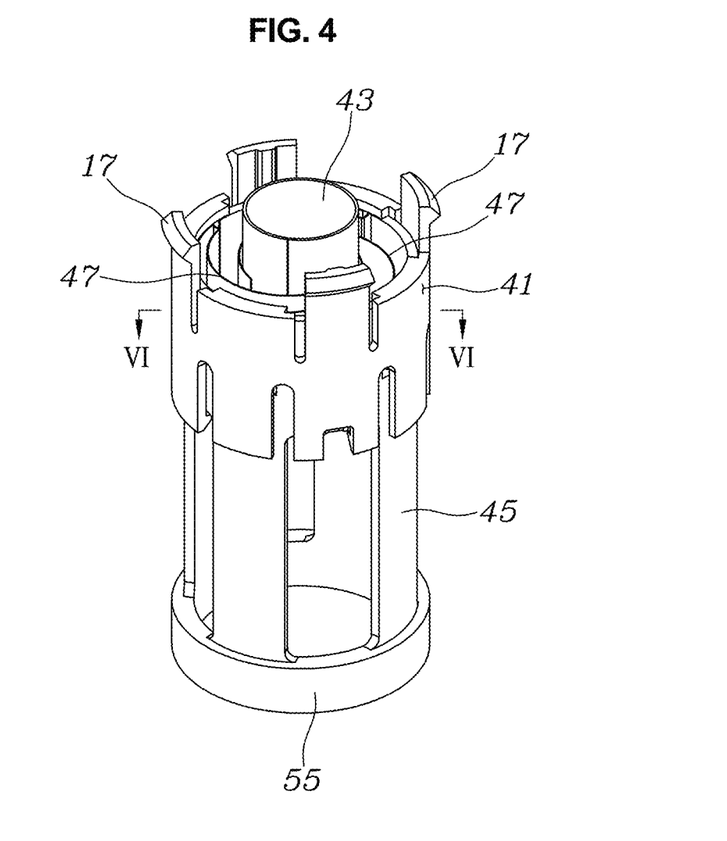
FIG. 4 is a detailed view illustrating a swappable assembly in FIG. 3.
Figure 5:
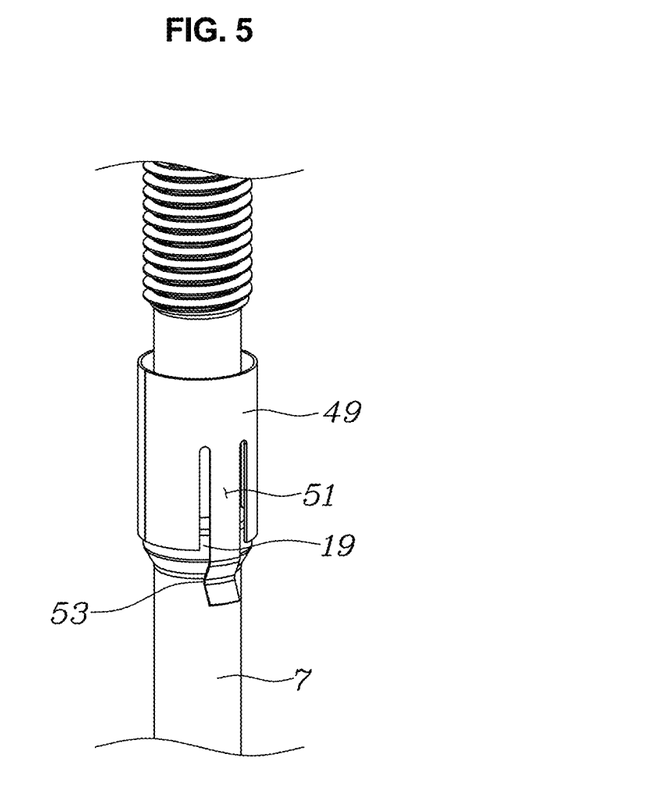
FIG. 5 is a detailed view illustrating a state in which a catching step portion of a fastening bolt is supported on inner sides of a cylindrical portion and an elastic supporting portion of a sleeve that constitutes the swappable assembly according to an embodiment of the present disclosure.

For reference, in FIG. 2, a lower cover 27 surrounding the lower side of the battery assembly 1 is further mounted at the lower side of the lower casing 11.

The upper end of the through pipe 3 is fixed to the upper casing 13 by a hollow bolt 29 that is fastened by passing through the upper casing 13, and a thread portion of the fastening bolt 7 is fastened to a fixing nut 31 that is provided at the vehicle body 9 positioned at the upper side of the battery assembly 1. The fixing nut 31 is fixed to a vehicle body member 35 having an upper side and a lower side provided at an upper side of a floor panel 33.

The fixing nut 31 is rigidly fixed to the vehicle body 9 by using the vehicle body member 35 that is mounted long in a transverse direction or a longitudinal direction of the vehicle body 9. In particular, a lower side of the fixing nut 31 is rigidly fixed to the vehicle body member 35 by a lower reinforcing bracket 37 from the upper side of the floor panel 33, and an upper side of the fixing nut 31 is fixed to the vehicle body member 35 by an upper reinforcing bracket 39.

The fastening bolt 7 is fastened to the fixing nut 31 that is fixed to the vehicle body 9, and the bolt head 25 at the lower side of the fastening bolt 7 applies the fastening pressure to the lower end of the through pipe 3 through the mounting cup 23. As a result, the battery assembly 1 is rigidly fixed to the lower side of the vehicle body 9.

The swappable assembly 5 includes: a first fixing guide 41 provided with the fixing protrusion 17 and elastically fixed to the fixing groove 15 of the through pipe 3; a sleeve 43 surrounding an outer circumferential surface of the fastening bolt 7 from inside the first fixing guide 41; a second fixing guide 45 mounted between the first fixing guide 41 and the sleeve 43; and a guide spring 47 elastically supporting the sleeve 43 with respect to the second fixing guide 45.

In other words, the second fixing guide 45 elastically supports the sleeve 43 through the guide spring 47. Furthermore, in a state in which the first fixing guide 41 is coupled to the second fixing guide 45, the first fixing guide 41 is coupled inside the through pipe 3. Eventually, the sleeve 43 inside the through pipe 3 holds the fastening bolt 7 and is elastically supported.

The sleeve 43 includes: a cylindrical portion 49 surrounding the outer circumferential surface of the fastening bolt 7; an elastic support portion 51 that protrudes downward from the cylindrical portion 49; and a plurality of holding protrusions 53 that protrudes toward an inner side of the cylindrical portion 49 from the elastic support portion 51 such that the outer circumferential surface of the fastening bolt 7 is pressed.

The holding protrusion 53 is formed in a shape that narrows toward the inner side of the cylindrical portion 49 and expands again, from a lower end of the elastic supporting portion 51 to the upper side of the elastic supporting portion 51.

The guide spring 47 is formed of multiple leaf springs connecting between the second fixing guide 45 and the sleeve 43, and a surface of the leaf spring is disposed parallel to a longitudinal direction of the sleeve 43.

Here, the surface of the leaf spring may be understood as the widest surface of the leaf spring, and the surface is disposed such that the surface is perpendicular to a plane that is perpendicular to the longitudinal direction of the sleeve 43. Therefore, when the sleeve 43 is moved with respect to the second fixing guide 45, the guide spring 47 is configured to be deformed on the plane (a plane as illustrated in FIG. 6) perpendicular to the longitudinal direction of the sleeve 43.

Figure 6:
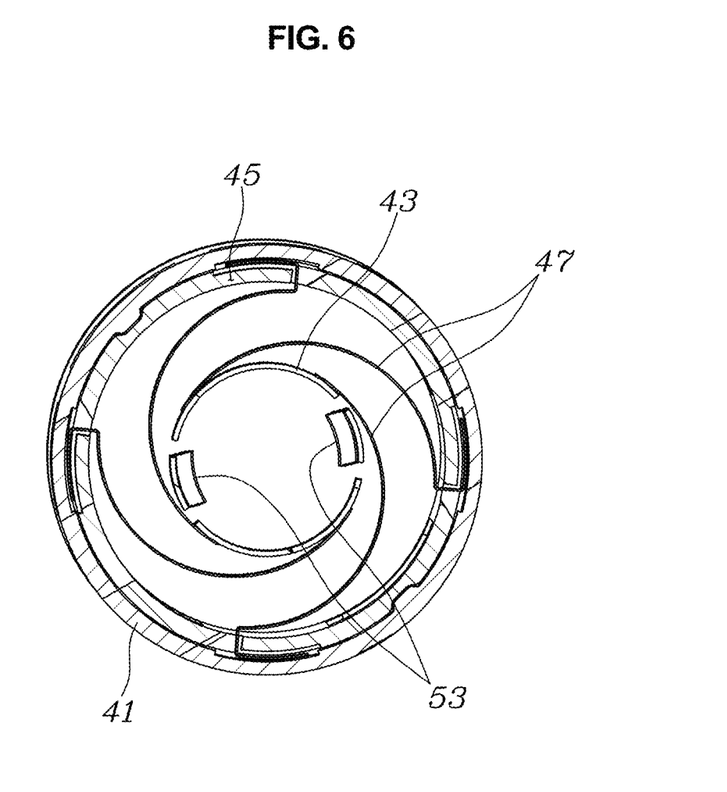
FIG. 6 is a view illustrating a state in which a second fixing guide and the sleeve of the swappable assembly are connected to each other by multiple guide springs according to an embodiment of the present disclosure.

As illustrated in FIG. 6, the guide spring 47 is formed of the multiple leaf springs disposed between the second fixing guide and the sleeve 43 such that a spiral shape centered on the sleeve 43 is formed. Therefore, when the sleeve 43 is moved within the second fixing guide 45 or a posture of the sleeve 43 is changed, the sleeve 43 is capable of being returned to an original position and an original posture.

Therefore, the fastening angle of the fastening bolt 7 guided by the sleeve 43 is capable of being always maintained in a correct state stably. Furthermore, even in a state in which a center of the fastening bolt 7 and a center of the fixing nut 31 of the vehicle body 9 is slightly misaligned from each other, the center of the sleeve 43 is automatically aligned with the center of the fixing nut 31 as the fastening bolt 7 is pressed upward, so that a guiding effect of realizing smooth and stable fastening work of the fastening bolt 7 and the fixing nut 31 may be secured.

Meanwhile, when the fastening bolt 7 is pushed toward the center of the sleeve 43, the holding protrusion 53 is spread, and the fastening bolt 7 is capable of being inserted into the sleeve 43. Furthermore, in a state in which the catching step portion 19 of the fastening bolt 7 passes through the holding protrusion 53, the fastening bolt 7 is not separated from the sleeve 43 even when the fastening bolt 7 is in a state in which the fastening bolt 7 is not fastened to the fixing nut 31 of the vehicle body 9.

Accordingly, once the battery assembly 1 is assembled on the vehicle body 9, even if the fastening bolt 7 is completely released from the fixing nut 31 due to a reason such as maintenance or replacement, the fastening bolt 7 is elastically supported by the sleeve 43, so that the fastening bolt 7 is not completely separated from the battery assembly 1.

Therefore, when the fastening bolt 7 is repeatedly fastened and released, unless the fastening bolt 7 is required to be replaced, the fastening bolt 7 is continuously together with the battery assembly 1, and a plurality of fastening bolts 7 does not have to be handled separately, so that workability such as replacement or repair of the battery assembly 1 may be very excellently secured.

When the fastening bolt 7 is desired to be replaced due to damage or the like, replacement of the fastening bolt 7 may be realized relatively easily by pulling the fastening bolt 7 enough to overcome the elastic force provided by the holding protrusion 53 of the sleeve 43.

Meanwhile, the second fixing guide 45 is provided with a tool catching ring 55 which extends long downwardly and which is positioned at a lower inner portion of the through pipe 3.

Figure 7:
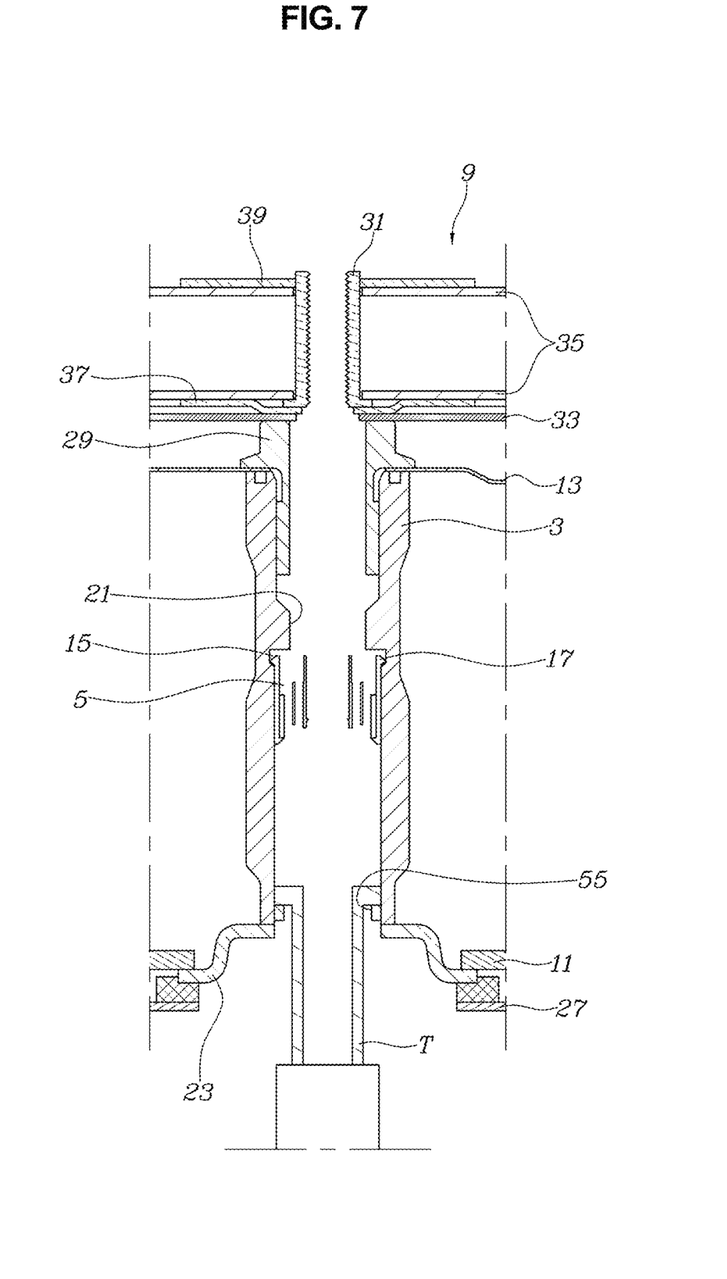
FIG. 7 is a view illustrating removal of the swappable assembly from a through pipe by using a tool according to an embodiment of the present disclosure.

Therefore, as illustrated in FIG. 7, when a separate tool T is caught on the tool catching ring 55 and the separate tool T is pulled downward, the fixing protrusion 17 elastically coupled to the fixing groove 15 is separated from the fixing groove 15, and the swappable assembly 5 is easily separated from the through pipe 3, so that repair or replacement of the swappable assembly may be very easily realized.

As discussed above, the battery assembly 1 mounting structure for a vehicle according to an embodiment of the present disclosure includes: the through pipe 3 mounted such that the through pipe 3 passes through between the lower casing 11 and the upper casing 13 of the battery assembly 1; the swappable assembly fixed to the inner portion of the through pipe 3; and the fastening bolt 7 which passes through the swappable assembly 5 from the lower side of the swappable assembly 5 to the upper side of the swappable assembly 5 and fixes the battery assembly 1 to the vehicle body 9 positioned above the fastening bolt 7.

Here, the swappable assembly 5 is configured such that a state in which a center portion of the fastening bolt 7 is supported by the elastic force from a center portion between the lower casing 11 and the upper casing 13 of the battery assembly 1 is formed.

The center portion of the fastening bolt 7 is integrally provided with the catching step portion 19 that protrudes outward. Furthermore, the swappable assembly 5 includes: the sleeve 43 integrally provided with the elastic supporting portion 51 that elastically supports the catching step portion 19 of the fastening bolt 7; the first fixing guide 41 provided with the fixing protrusion 17 that fixes the swappable assembly 5 to the through pipe 3; and the second fixing guide 45 which is fixed to the inner portion of the first fixing guide 41 and which elastically supports the sleeve 43 by using the multiple guide springs 47.

The fixing groove 15 into which the fixing protrusion 17 of the swappable assembly 5 is elastically inserted is formed in the inner circumferential surface of the through pipe 3, the limiting portion 21 limiting the upward movement of the swappable assembly 5 is provided at the upper side of the fixing groove 15, and the lower side of the fixing groove 15 has the constant opening cross-section so that the swappable assembly 5 is capable of being linearly slid in the vertical direction.

The upper end of the through pipe 3 is fixed to the upper casing 13 by the hollow bolt 29 while the upper end of the through pipe 3 is in contact with the upper casing 13 of the battery assembly 1, the lower end of the through pipe 3 is connected to the lower casing 11 of the battery assembly 1 through the mounting cup 23, and the bolt head 25 of the fastening bolt 7 is configured to apply the fastening pressure to the lower end of the through pipe 3 through the mounting cup 23 when the thread portion of the fastening bolt 7 is fastened to the fixing nut 31 that is provided at the vehicle body 9.

Although embodiments of the present disclosure have been described herein, it should be understood that the present disclosure should not be limited to these embodiments and that various changes and modifications can be made by one ordinary skilled in the art within the spirit and scope of the present disclosure.

What is claimed is:

1. A battery assembly mounting structure for a vehicle, the battery assembly mounting structure comprising:
   a through pipe provided in a battery assembly such that a space vertically passing through the battery assembly is formed in an inner portion of the battery assembly;
   a swappable assembly coupled to an inner portion of the through pipe by an elastic force; and
   a fastening bolt configured to pass through an inner portion of the swappable assembly and coupled to a vehicle body positioned at an upper side of the fastening bolt such that a fastening pressure is applied to a lower end of the through pipe.

2. The battery assembly mounting structure of claim 1, wherein a fixing groove for fixing the swappable assembly is provided in the inner portion of the through pipe, and
   a fixing protrusion protruding outward and elastically coupled to the fixing groove is provided on the swappable assembly.

3. The battery assembly mounting structure of claim 2, wherein:
   the fixing groove is formed in an inner circumferential surface of the through pipe such that the swappable assembly is fixed to a center portion in a vertical direction of the battery assembly, and
   a catching step portion protrudes on a center portion in an entire length of the fastening bolt such that the catching step portion is elastically supported on the swappable assembly.

4. The battery assembly mounting structure of claim 2, wherein:
   the through pipe is provided with a limiting portion,
   the limiting portion is configured to protrude inward on an upper side of the fixing groove and limit a movement of the swappable assembly, and
   a lower side of the fixing groove of the through pipe has a constant opening cross-section.

5. The battery assembly mounting structure of claim 4, wherein:
   an upper end of the through pipe is in contact with an upper casing of the battery assembly,
   the lower end of the through pipe is connected to a lower casing of the battery assembly through a mounting cup, and
   a bolt head of the fastening bolt is fastened such that the fastening pressure is applied to the lower end of the through pipe through the mounting cup.

6. The battery assembly mounting structure of claim 5, wherein:
   the upper end of the through pipe is fixed to the upper casing by a hollow bolt fastened by passing through the upper casing,
   a thread portion of the fastening bolt is fastened to a fixing nut provided at the vehicle body positioned at an upper side of the battery assembly, and
   the fixing nut has an upper side and a lower side fixed to a vehicle body member that is provided at an upper side of a floor panel.

7. The battery assembly mounting structure of claim 2, wherein the swappable assembly comprises:
   a first fixing guide provided with the fixing protrusion and elastically fixed to the fixing groove of the through pipe;
   a sleeve surrounding an outer circumferential surface of the fastening bolt within the first fixing guide;
   a second fixing guide mounted between the first fixing guide and the sleeve; and
   a guide spring elastically supporting the sleeve with respect to the second fixing guide.

8. The battery assembly mounting structure of claim 7, wherein the sleeve comprises:
   a cylindrical portion surrounding the outer circumferential surface of the fastening bolt;
   an elastic supporting portion that protrudes downwardly from the cylindrical portion; and
   a plurality of holding protrusions which protrudes to an inner side of the cylindrical portion from the elastic supporting portion and which is configured to press the outer circumferential surface of the fastening bolt.

9. The battery assembly mounting structure of claim 8, wherein the plurality of holding protrusions is formed in a shape that narrows toward the inner side of the cylindrical portion and expands again, from a lower end portion of the elastic supporting portion to an upper side of the elastic supporting portion.

10. The battery assembly mounting structure of claim 7, wherein:
    the guide spring includes a plurality of leaf springs connecting between the second fixing guide and the sleeve, and
    surfaces of the plurality of leaf springs are disposed parallel to a longitudinal direction of the sleeve.

11. The battery assembly mounting structure of claim 10, wherein the plurality of leaf springs disposed between the second fixing guide and the sleeve is configured to form a spiral shape centered on the sleeve.

12. The battery assembly mounting structure of claim 7, wherein the second fixing guide is provided with a tool catching ring which extends long downwardly and which is positioned at a lower inner portion of the through pipe.

13. A battery assembly mounting structure for a vehicle, the battery assembly mounting structure comprising:
- a through pipe configured to pass through between a lower casing and an upper casing of a battery assembly;
- a swappable assembly fixed to an inner portion of the through pipe; and
- a fastening bolt configured to pass through the swappable assembly from a lower side of the swappable assembly to an upper side of the swappable assembly, thereby fixing the battery assembly to a vehicle body positioned at an upper side of the battery assembly,
- wherein a center portion of the fastening bolt is supported by an elastic force from a center portion between the lower casing and the upper casing of the battery assembly.

14. The battery assembly mounting structure of claim 13, wherein the center portion of the fastening bolt is integrally provided with a catching step portion that protrudes outward, and
the swappable assembly comprises:
- a sleeve integrally provided with an elastic supporting portion that elastically supports the catching step portion of the fastening bolt;
- a first fixing guide provided with a fixing protrusion that fix the swappable assembly to the through pipe; and
- a second fixing guide which is fixed to an inner portion of the first fixing guide and which elastically supports the sleeve by a plurality of guide springs.

15. The battery assembly mounting structure of claim 14, wherein:
- a fixing groove into which the fixing protrusion of the swappable assembly is elastically inserted is famed in an inner circumferential surface of the through pipe,
- a limiting portion limiting an upward movement of the swappable assembly is provided at an upper side of the fixing groove, and
- a lower side of the fixing groove has a constant opening cross-section so that the swappable assembly is capable of being linearly slid in a vertical direction.

16. The battery assembly mounting structure of claim 15, wherein:
- an upper end of the through pipe is fixed to the upper casing by a hollow bolt while being in a state in which the upper end of the through pipe is in contact with the upper casing of the battery assembly,
- a lower end of the through pipe is connected to the lower casing of the battery assembly through a mounting cup, and
- a bolt head of the fastening bolt is configured such that a fastening pressure is applied to the lower end of the through pipe through the mounting cup when a thread portion of the fastening bolt is fastened to a fixing nut that is provided at the vehicle body.

* * * * *